(No Model.)

A. MEAD.
REFRIGERATOR.

No. 244,912. Patented July 26, 1881.

Witnesses:
H. G. Wadlin.
W. Climo.

Inventor:
Alpheus Mead,
by Wright Brown
Att'ys.

UNITED STATES PATENT OFFICE.

ALPHEUS MEAD, OF BOSTON, MASSACHUSETTS.

REFRIGERATOR.

SPECIFICATION forming part of Letters Patent No. 244,912, dated July 26, 1881.

Application filed March 30, 1881. (No model.)

*To all whom it may concern:*

Be it known that I, ALPHEUS MEAD, of Boston, in the county of Suffolk and State of Massachusetts, have invented certain Improvements in Refrigerators, of which the following is a specification.

This invention has for its object to provide an improved refrigerator adapted to be used for the preservation of corned meat immersed in water or brine; and it consists in the improvements which I will now proceed to describe and claim.

Figure 1:
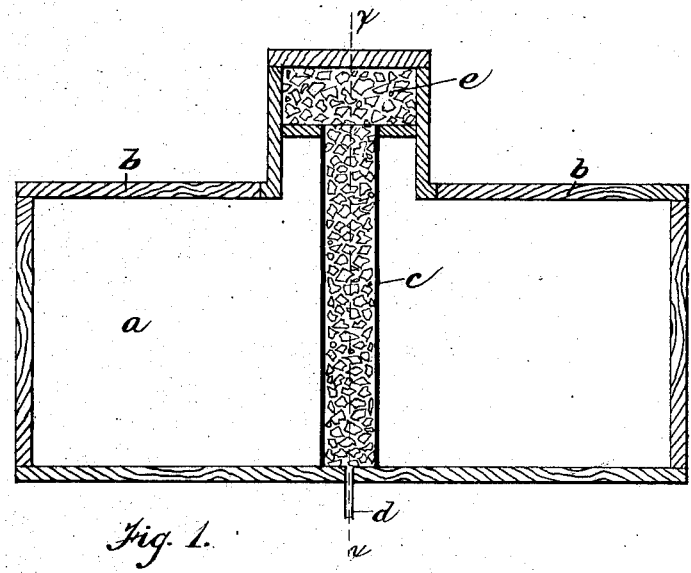
Figure 2:
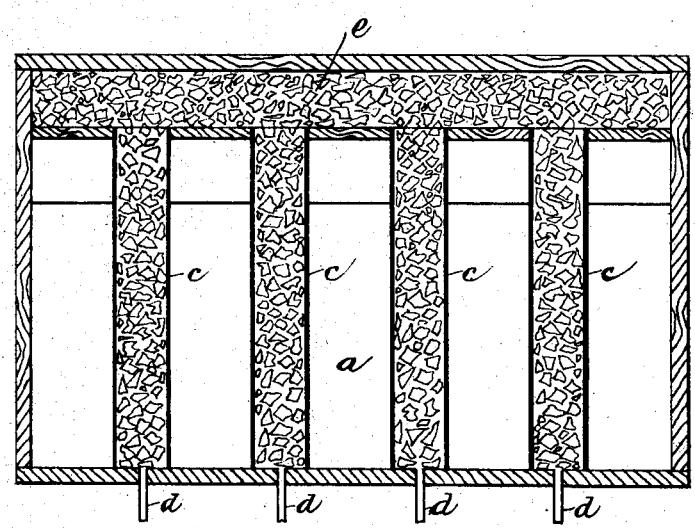

Of the accompanying drawings, forming a part of this specification, Figure 1 represents a longitudinal vertical section of a refrigerator embodying my invention. Fig. 2 represents a section on line $x$ $x$, Fig. 1.

The same letters refer to the same parts in both figures.

In the drawings, $a$ represents a water-tight chamber or box adapted to hold water or brine and meat immersed therein, and provided with a suitable cover, $b$.

$c$ represents a substantially vertical sheet-metal receptacle, preferably made in the form of a tube, and extending through the chamber $a$ from top to bottom, the upper end of said receptacle $c$ being outside of the chamber $a$, and its lower end terminating at the bottom of said chamber, so that there is no communication between the interiors of the receptacle and the chamber. The receptacle $c$ is preferably about four inches or more in diameter, and is adapted to contain a mixture of ice and salt, the same being received in the upper end of the receptacle.

In the bottom of the receptacle is an escape pipe, $d$, to conduct away the melted ice and salt from the receptacle without permitting it to enter the chamber $a$.

It will be seen that the ice and salt produce a very low degree of temperature in the sheet-metal receptacle $c$, and that the brine in contact with said receptacle is correspondingly reduced in temperature. I have found that in practice I can keep the brine at a temperature of about 6° below zero, Fahrenheit, so that I am enabled by the described apparatus to keep corned meat any desired length of time in the hottest weather.

To conveniently supply the receptacle $c$ with ice and salt, I provide at the upper end of the receptacle a box or trough, $e$, communicating with the receptacle and adapted to contain a quantity of broken ice and salt, a part of which will gravitate into the receptacle when the supply in the latter is reduced by melting, so that the box $e$ acts, to some extent, as a self-feeder. The box $e$, moreover, enables the ice and salt to be conveniently introduced into the receptacle, and by holding a supply of ice and salt over the top of the receptacle prevents the admission of warm air into the receptacle when the ice is being forced into the same.

If desired more than one receptacle $c$ may be employed, and in most cases two or more will be found desirable, as shown in Fig. 2, the box or trough $e$ communicating with all of the receptacles.

The tubular form of the receptacles not only affords strength, preventing the receptacles from being indented by the contents of the chamber $a$, but also gives the receptacles a large extent of cooling-surface.

The chamber $a$ may project equally from both sides of the receptacles $c$, as shown in Fig. 1, or the receptacles may be located at one end of the chamber.

It is obvious that the described apparatus may be used as a non-circulating dry-air refrigerator, if desired.

Having thus described my invention, I claim—

1. The improved method of preserving corned meat, which consists in immersing the meat in brine in a water-tight vessel or chamber cooled by an inclosed refrigerant which is separated from the brine, substantially as specified.

2. The water-tight chamber $a$, adapted to receive brine and meat immersed therein, combined with a refrigerant-receptacle automatically fed and constantly drained of waste, substantially as shown.

In testimony whereof I have signed my name to this specification, in the presence of two subscribing witnesses, this 26th day of March, A. D. 1881.

ALPHEUS MEAD.

Witnesses:
GEORGE S. COLE,
C. F. BROWN.